United States Patent
Koyama et al.

(10) Patent No.: US 7,477,216 B2
(45) Date of Patent: Jan. 13, 2009

(54) DISPLAY DEVICE AND ELECTRONIC APPARATUS

(75) Inventors: Jun Koyama, Sagamihara (JP); Keitaro Imai, Yokohama (JP); Shinji Maekawa, Atsugi (JP); Makoto Furuno, Atsugi (JP); Osamu Nakamura, Atsugi (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 554 days.

(21) Appl. No.: 10/885,074

(22) Filed: Jul. 7, 2004

(65) Prior Publication Data
US 2005/0012732 A1      Jan. 20, 2005

(30) Foreign Application Priority Data
Jul. 18, 2003      (JP) ............... 2003-277191

(51) Int. Cl.
G09G 3/30      (2006.01)
(52) U.S. Cl. ............ 345/76; 345/205
(58) Field of Classification Search ........... 345/76–100, 345/204, 205, 211–213; 349/149, 150, 152; 313/498–500; 315/169.3
See application file for complete search history.

(56) References Cited

U.S. PATENT DOCUMENTS

| | | | |
|---|---|---|---|
| 5,091,334 A | 2/1992 | Yamazaki et al. | |
| 5,262,350 A | 11/1993 | Yamazaki et al. | |
| 5,262,654 A | 11/1993 | Yamazaki | |
| 5,289,030 A * | 2/1994 | Yamazaki et al. | 257/410 |
| 5,453,858 A | 9/1995 | Yamazaki | |
| 5,591,987 A | 1/1997 | Yamazaki et al. | |
| 5,764,225 A | 6/1998 | Koshobu | |
| 5,849,601 A | 12/1998 | Yamazaki | |
| 5,859,443 A | 1/1999 | Yamazaki | |
| 5,889,291 A | 3/1999 | Koyama et al. | |
| 5,949,397 A | 9/1999 | Koyama et al. | |
| 6,288,487 B1 * | 9/2001 | Arai | 313/506 |
| 6,295,047 B1 | 9/2001 | Koyama et al. | |
| 6,355,941 B1 | 3/2002 | Yamazaki et al. | |
| 6,417,830 B1 * | 7/2002 | Byeon, II | 345/99 |
| 6,476,791 B2 | 11/2002 | Koyama et al. | |
| 6,480,181 B2 * | 11/2002 | Ishii | 345/100 |
| 6,580,423 B1 * | 6/2003 | Murade | 345/204 |
| 6,747,627 B1 | 6/2004 | Koyama et al. | |
| 6,774,419 B2 | 8/2004 | Kimura | |
| 2002/0033783 A1 | 3/2002 | Koyama | |
| 2002/0070382 A1 | 6/2002 | Yamazaki et al. | |
| 2003/0210219 A1 * | 11/2003 | Osame | 345/92 |
| 2005/0012887 A1 | 1/2005 | Koyama et al. | |

* cited by examiner

*Primary Examiner*—Alexander Eisen
*Assistant Examiner*—Kenneth B Lee, Jr.
(74) *Attorney, Agent, or Firm*—Eric J. Robinson; Robinson Intellectual Property Law Office, P.C.

(57) ABSTRACT

When a pixel and a signal line driver circuit are made up of semi-amorphous TFTs, an amplitude for driving the pixel has to be made larger, and a high power supply voltage is needed. The high power supply voltage increases power consumption in the case of partial drive. According to the invention, in order to reduce power consumption, a gate signal line driver circuit stores data of whether each gate signal line is used for displaying an image or not, thereby stopping driving of a gate signal line which is not required to be driven.

40 Claims, 13 Drawing Sheets

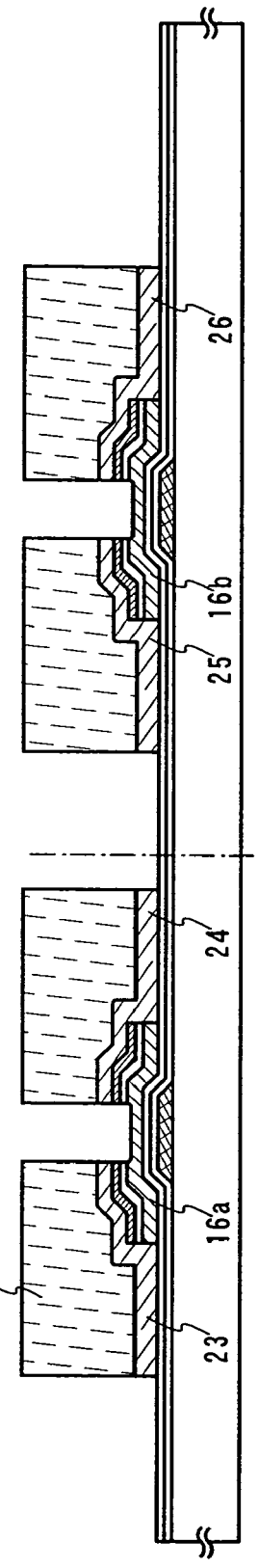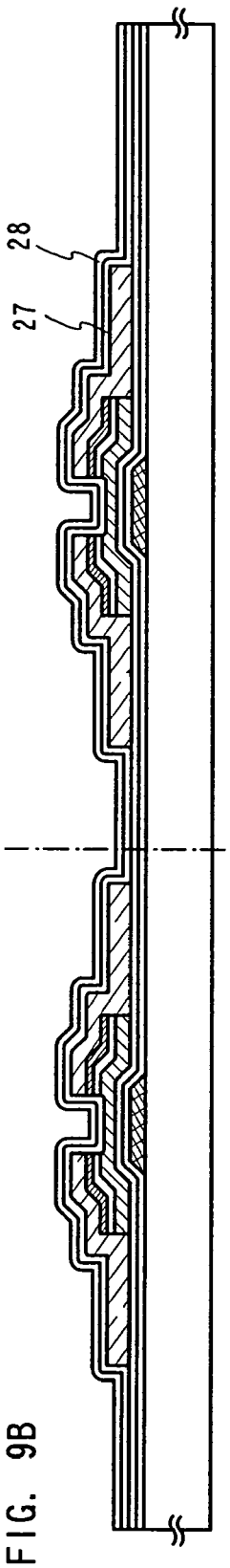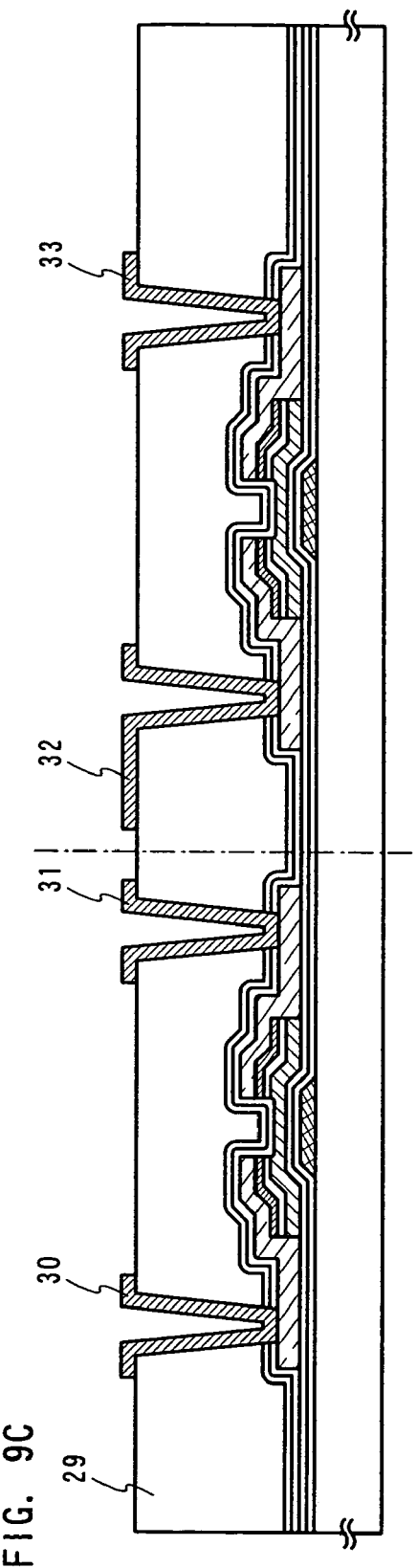

DISPLAY DEVICE AND ELECTRONIC APPARATUS

BACKGROUND OF THE INVENTION

1. Field of the Invention

The present invention relates to a display device, and more particularly, to a display device comprising an element using a semi-amorphous thin film semiconductor. The invention further relates to an electronic apparatus using the display device.

2. Description of the Related Art

In recent years, Internet has been widely used with the development of communication technologies. It is expected that moving pictures and larger amount of information are transmitted in the future. In view of this, personal computers have been popularized for private use and on business, and a large sized display device such as a liquid crystal television has also been produced in quantities and popularized.

Among the display devices, a display device using a thin film transistor (hereinafter referred to as a TFT), such as a liquid crystal display device in particular, has been manufactured actively. An active matrix display device using a TFT can exhibit a higher image quality in contrast and gray scale levels as compared with a passive display device.

In such a display device using a TFT, a TFT whose channel forming region comprises an amorphous semiconductor (hereinafter referred to as an amorphous TFT) is widely used. A display device using an amorphous TFT displays images by using an inverted staggered TFT formed on a glass substrate and controlling pixels of the display device each including the TFT.

FIG. 4A is a plan view of a liquid crystal display device using an amorphous TFT. In FIG. 4A, a conventional liquid crystal display device comprises an amorphous TFT substrate 401, a counter substrate 402, a pixel portion 403, source signal line driver LSIs 405, gate signal line driver LSIs 404, FPCs 406, and the like. The signal line driver LSIs 404 and 405 comprise single crystalline LSIs and mounted on the amorphous TFT substrate 401. Signals are inputted from outside to the signal line driver LSIs 404 and 405 via the FPCs 406. Although the LSIs are mounted on the amorphous TFT substrate 401 in FIG. 4A, they may be mounted on the FPCs.

FIG. 4B shows a cross sectional structure taken by cutting along a dotted line of FIG. 4A. A liquid crystal is disposed between the amorphous TFT substrate 401 and the counter substrate 402 and sealed with a sealing member 407.

The aforementioned liquid crystal display device using an amorphous TFT has a problem that the property of a transistor, for example a mobility or a threshold value, is inferior to that of a transistor using single crystalline silicon.

For example, when comparing the mobility of an N-channel single crystalline transistor with an amorphous TFT, the former has a mobility of 600 to 800 cm$^2$/Vs, whereas the latter has a mobility of about 0.5 cm$^2$/Vs. Thus, the electrical property of the amorphous TFT is $\frac{1}{1000}$ that of the single crystalline transistor, and therefore, it cannot make up an electrical circuit as free as the single crystalline transistor. The amorphous TFT is capable of driving pixels but not signal lines in a liquid crystal display device.

Accordingly, in a liquid crystal display device using an amorphous TFT, a driver circuit for driving signal lines is made up of LSIs using single crystalline transistors. The LSIs can drive the signal lines, however, the driver circuit has to be attached externally or connected to a glass substrate, leading to defects such as increase in the cost of implementation, and lowered reliability in a connecting part. On the other hand, a display device in which pixels and a driver circuit are integrally formed on a glass substrate by using a polysilicon TFT has been developed. A polysilicon TFT exhibits a mobility of about 100 to 200 cm$^2$/Vs, thus a driver circuit can be formed integrally. In order to form a polysilicon TFT, however, manufacturing steps for laser crystallization, heat treatment, doping and the like are additionally required. Therefore, a glass substrate can not be made larger due to limitations of the manufacturing equipment and the costs are increased as compared with an amorphous TFT.

In view of the foregoing, pixels, a signal line driver circuit, and a gate signal line driver circuit in particular may be integrally formed by using a semi-amorphous semiconductor (hereinafter referred to as an SAS) so that external driver circuits and connecting parts thereof are reduced and the cost of implementation and reliability in the connecting parts are improved. However, a threshold voltage of an SAS TFT is higher than that of a polysilicon TFT, therefore, the amplitude for driving a signal line has to be made larger and a power supply voltage has to be made higher in the case of forming a pixel by using the SAS, leading to higher power consumption.

FIG. 2 shows an example of a conventional gate signal line driver circuit. In FIG. 2, a shift register 201 comprises clocked inverters 202 and 203, and an inverter 204. The driver circuit comprises the shift register 201, a NAND 207, a NOR 208, and buffering inverters 209 and 210, and it drives gate signal lines G1, G2, ..., Gy in sequence.

As for a display device for monitoring, image persistence becomes a problem of concern when it is used for long periods of time. Image persistence may occur, more or less, in any of display devices. In a self-light emitting display device, luminance decays as a light emitting layer degrades. In particular, when the self-light emitting display device continues to display a fixed image, luminance decays only in a light emitting area, and thus the preceding image remains when displaying a solid image thereafter. In a liquid crystal display device also, a liquid crystal material degrades when a fixed image continues to be displayed, thus the image remains when the subsequent image is displayed.

In order to avoid such a problem, a monitor screen is turned off and partial display is performed when a user does not use the monitor screen for a certain period. FIGS. 3A and 3B show an example of this case. In FIG. 3A, a normal image is displayed on a screen whereas only time is displayed on a part of the screen in FIG. 3B. Such a partial display mode prevents the occurrence of image persistence.

However, even in a partial display mode, a conventional gate signal line driver circuit continues to be driven, which consumes as much power as in a normal display mode.

SUMMARY OF THE INVENTION

In view of the foregoing, according to the invention, gate signal lines which are not used for displaying an image are not driven so as to be Low (in the case where a pixel TFT is an N-channel TFT), while storing data of gate signal lines in the needed rows in a gate signal line driver circuit. Accordingly, no power is consumed in gate signal lines which are not required to be turned ON, leading to reduced power consumption of a display device.

A display device of the invention comprises on a substrate a plurality of gate signal lines, a plurality of pixels, and a gate signal line driver circuit. A gate signal line driver circuit comprises a latch circuit for storing data of whether each gate signal line is driven or not, a buffer circuit for driving the gate signal lines, and a circuit for controlling the buffer circuit by the latch circuit.

A display device of the invention comprises on a substrate a plurality of gate signal lines, a plurality of pixels, and a gate signal line driver circuit. The gate signal line driver circuit comprises a shift register, a first switch circuit, a second switch circuit, a latch circuit, and a buffer circuit. The first switch circuit is controlled by a first switching signal, and an output of the shift register is outputted to the latch circuit or the second switch circuit via the first switch circuit. The second switch circuit is controlled by an output of the latch circuit, and an output of the first switch circuit or a ground potential is outputted to an inverter via the second switch circuit. Also, the latch circuit is controlled by a latch pulse and stores the output of the first switch circuit.

In the aforementioned display device according to the invention, a pixel portion and a gate signal line driver circuit are integrally formed on a substrate by using a TFT whose channel portion comprises a semi-amorphous semiconductor (semi-amorphous TFT).

In the aforementioned display device according to the invention, the semi-amorphous TFT is a complementary TFT.

According to the invention, the aforementioned display device is a liquid crystal display device.

According to the invention, the aforementioned display device is a self-light emitting display device.

According to the invention, the aforementioned display device is formed by using an EL material.

The invention provides an electronic apparatus using the aforementioned display device.

As set forth above, according to the invention, a gate signal line which is not used for displaying an image is not required to be driven in the case of partial display, leading to reduced power consumption.

In such a manner, the invention provides a display device in which a signal line driver circuit and a gate signal line driver circuit in particular are integrally formed by using a TFT having few limitations in manufacturing steps, namely a TFT whose channel portion comprises a semi-amorphous semiconductor.

BRIEF DESCRIPTION OF THE DRAWINGS

FIGS. 9A to 9C are cross sectional views showing manufacturing steps of the invention.

DETAILED DESCRIPTION OF THE INVENTION

Embodiment Mode

Figure 1:
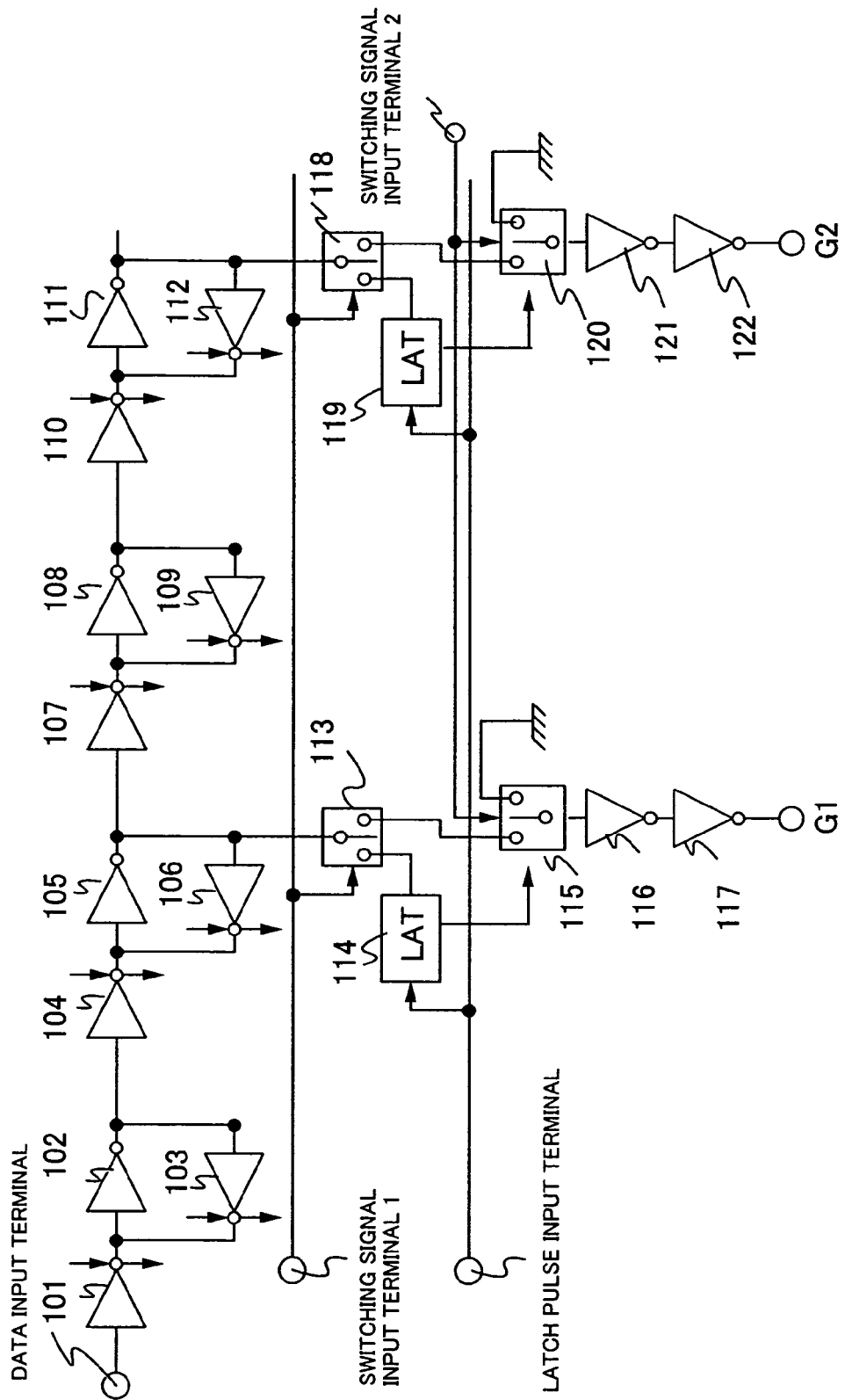
FIG. 1 is a diagram showing an embodiment mode of the invention.
Figure 2:
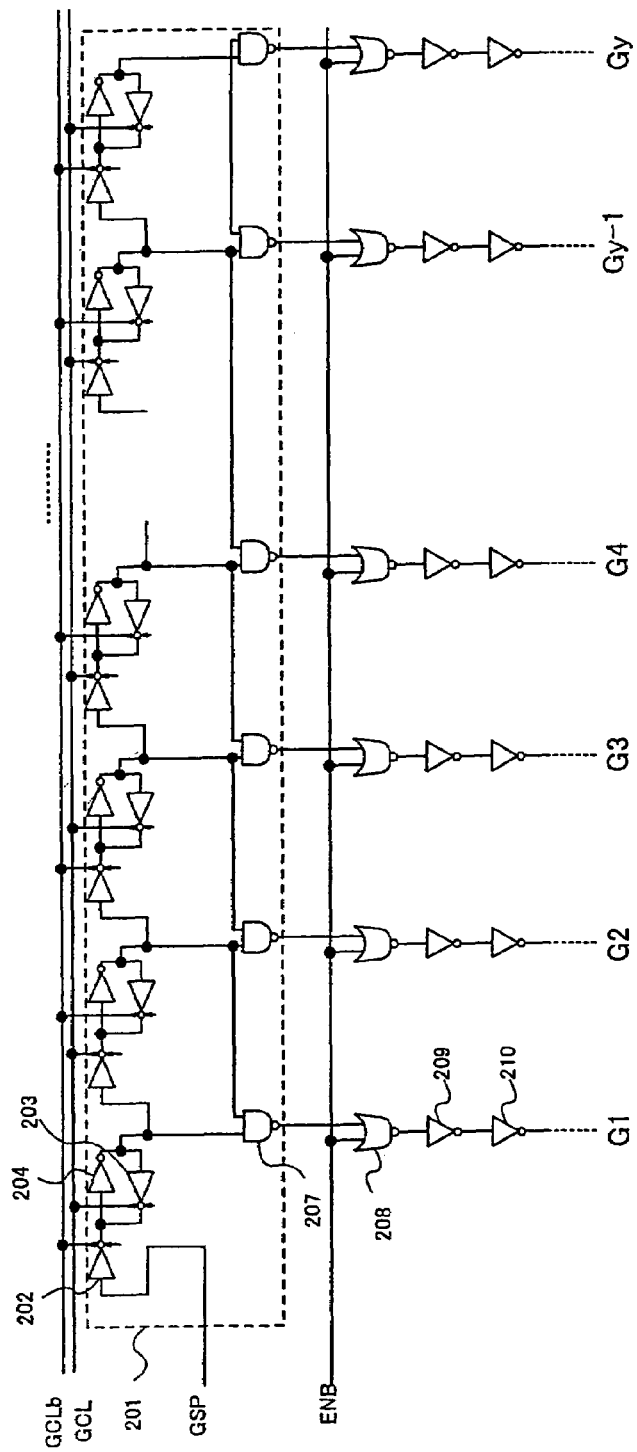
FIG. 2 is a diagram showing a conventional gate signal line driver circuit.
Figure 3A:
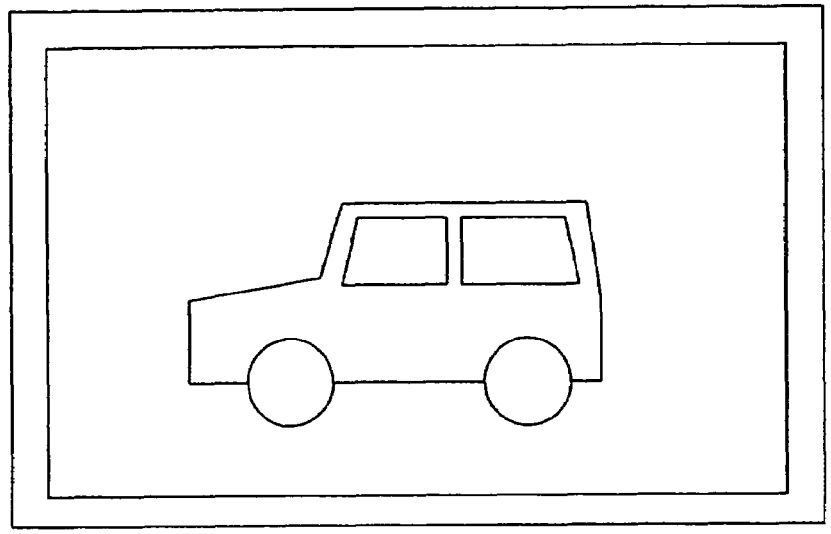
FIGS. 3A and 3B are diagrams each showing a partial drive of a display device.
Figure 3B:
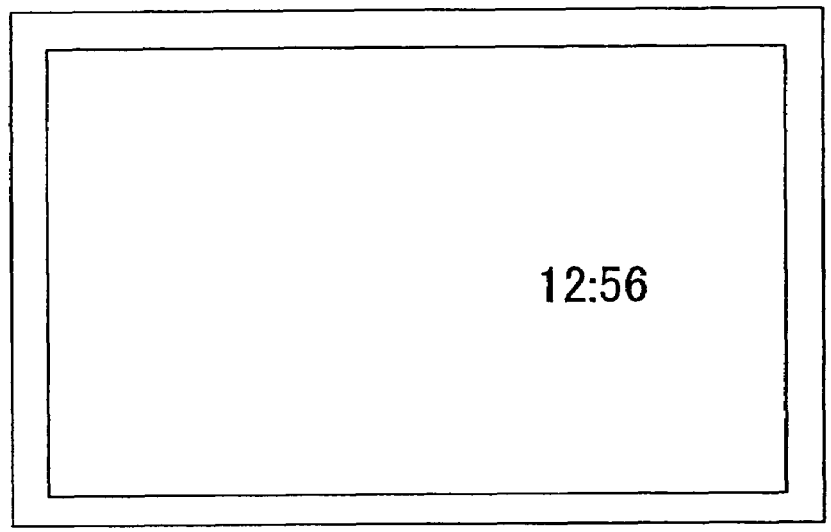
Figures 4A, 4B:
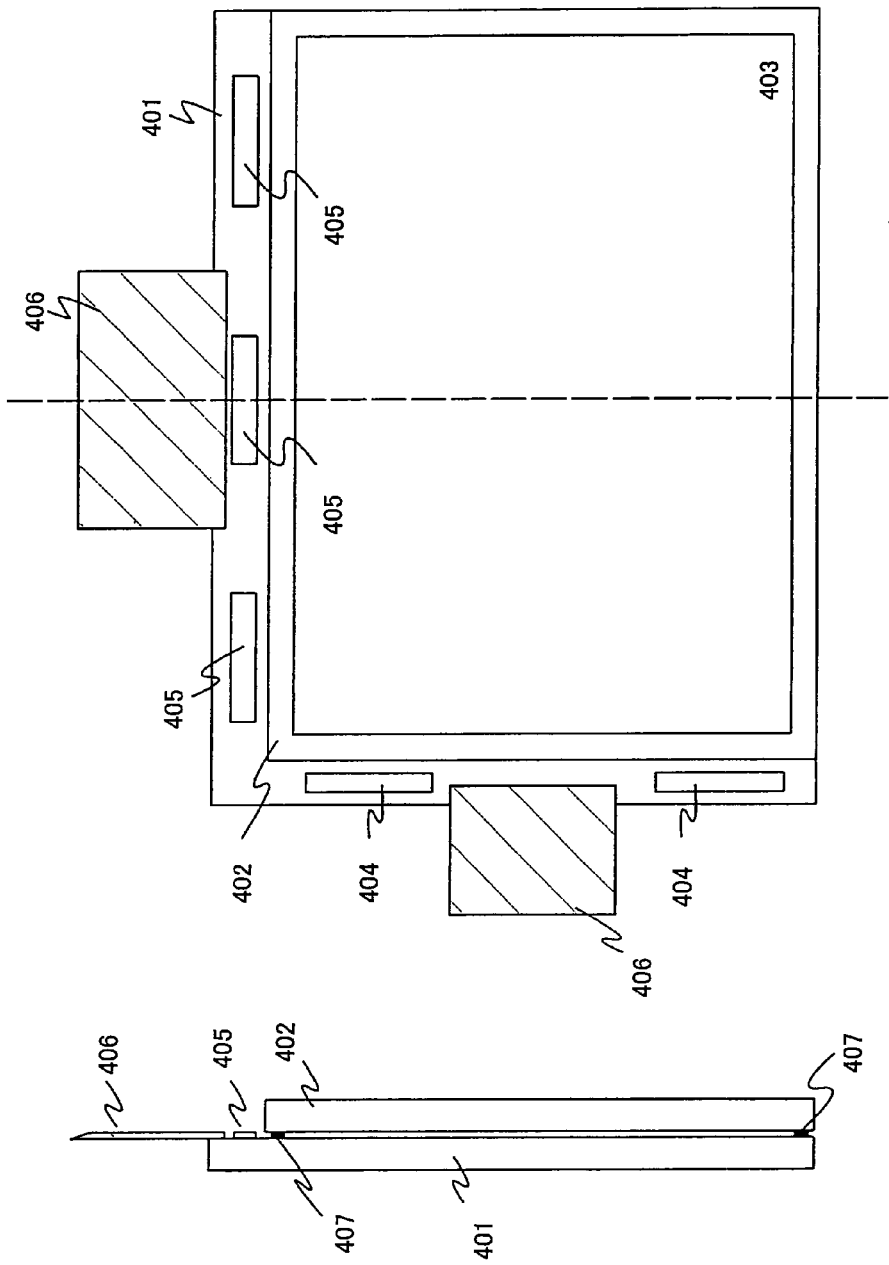
FIGS. 4A and 4B are diagrams each showing a conventional amorphous liquid crystal display device.

FIG. 1 shows an embodiment mode of the invention. A gate signal line driver circuit shown in FIG. 1 comprises a shift register which includes clocked inverters 101, 103, 104, 106, 107, 109, 110, and 112, and inverters 102, 105, 108, and 111. The gate signal line driver circuit further comprises switches 113, 118, 115, and 120, latch circuits 114 and 119, and buffering inverters 116, 117, 121, and 122.

The operation of the circuit is explained hereinafter. In a normal display mode, a signal is inputted to a switching signal input terminal 1 so that the switches 113 and 118 are connected to the switches 115 and 120, respectively. Meanwhile, a signal is inputted to a switching signal input terminal 2 so that the switches 115 and 120 are connected to the switches 113 and 118, respectively. In this manner, each output of the shift register is outputted to gate signal lines G1 and G2 via the inverters. Although not shown in FIG. 1, the same operation is performed for other gate lines.

The operation in a partial display mode is described next. A signal is inputted to the switching signal input terminal 1 so that the switches 113 and 118 are connected to the latch circuits 114 and 119, respectively. Meanwhile, a signal is inputted to the switching signal terminal 2 so that each of the switches 115 and 120 is connected differently depending on the output of the latch circuits. In such a state, data for determining which gate signal line to drive is sequentially outputted from a data input terminal. This data is transferred in the shift register, and when the data reaches an adequate stage, a latch pulse is inputted from a latch pulse input terminal and the data is latched in the latch circuits 114 and 119. For example, in the case where the latch circuit 114 stores data which does not drive the gate signal line and the latch circuit 119 stores data which drives the gate signal line, the switch 115 is connected to a ground potential, the inverters 116 and 117 are fixed, and the gate signal line G1 is fixed at a Low potential. On the other hand, the switch 120 is connected to the switch 118.

Subsequently, a signal is inputted to the switching signal input terminal 1 so that the switches 113 and 118 are connected to the switches 115 and 120, respectively. Then, a start pulse and a clock are inputted to drive needed gate signal lines only. In this manner, unnecessary gate signal lines are not driven and power consumption can thus be reduced.

The aforementioned circuits comprise TFTs whose channel portions are formed of semi-amorphous semiconductor. Typically, an inverted staggered TFT (bottom gate TFT) is used, though a staggered TFT (top gate TFT) may be used as well. An N-channel semi-amorphous TFT is more suitably applied to a driver circuit as compared with a P-channel semi-amorphous TFT because of the high mobility. However, either an N-channel TFT or a P-channel TFT may be used in the invention. In either case, it is preferable that all the TFTs formed on the same substrate have the same conductivity in order to reduce the number of manufacturing steps.

Embodiment 1

Figure 5A:
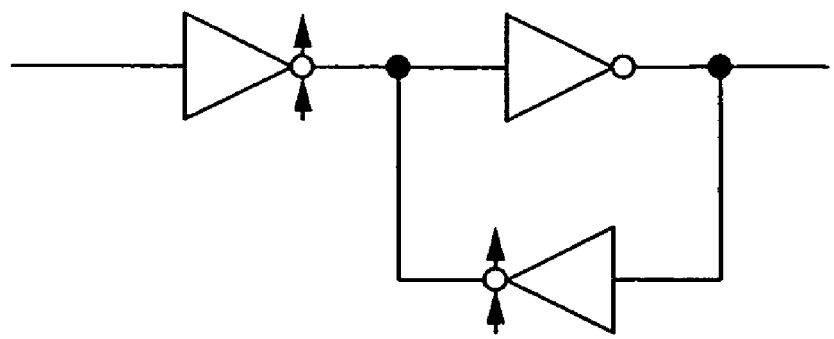
FIGS. 5A to 5C are diagrams each showing an embodiment of a latch circuit according to the invention.
Figure 5B:
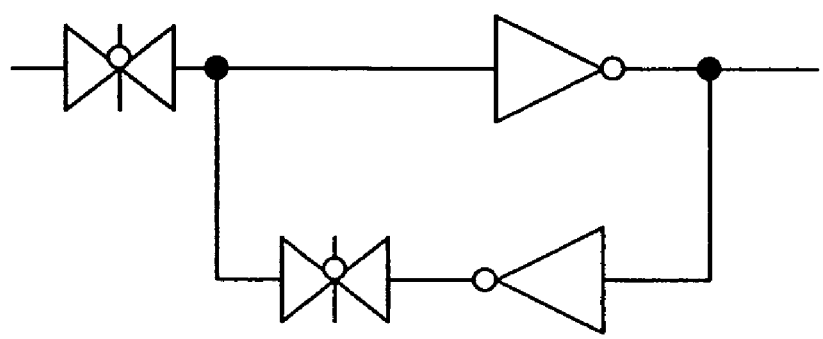
Figure 5C:
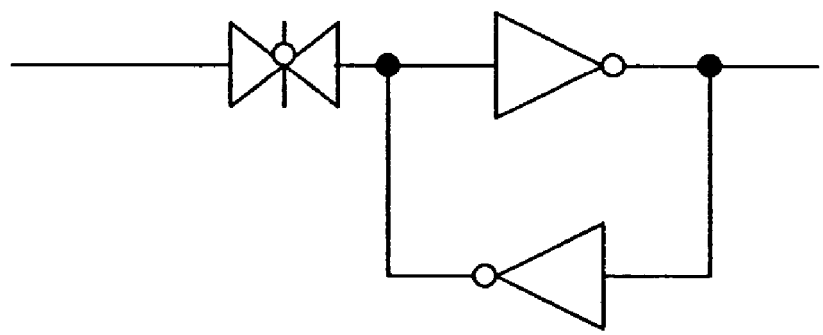

FIGS. 5A to 5C show specific examples of the latch circuit shown in Embodiment Mode. FIG. 5A shows a latch circuit using clocked inverters, which is used in the aforementioned shift register of the signal line driver circuit. FIG. 5B shows a latch circuit using inverters in combination with analog switches. In FIG. 5C, one analog switch is removed from the latch circuit shown in FIG. 5B. The latch circuit shown in FIG. 5C is designed so that one of the two inverters, whose output is connected to the analog switch, has a lower drive capacity than the analog switch and data to be stored can be changed in accordance with an operation of the analog switch. The invention can adopt any of the latch circuits shown herein as well as other circuit configurations.

Embodiment 2

Manufacturing steps of the display device of the invention are specifically explained hereinafter taking a liquid crystal display device as an example.

Figure 7A:
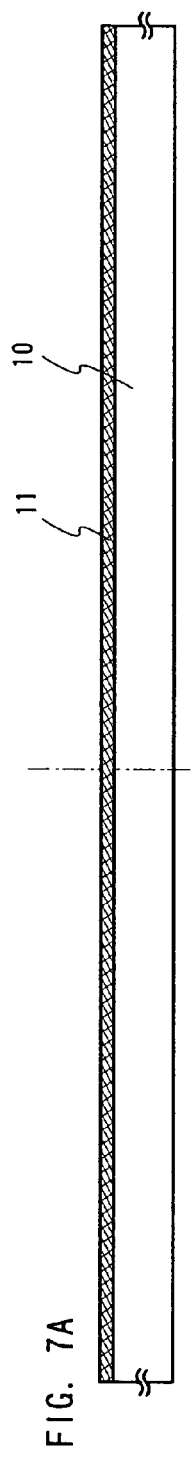
FIGS. 7A to 7D are cross sectional views showing manufacturing steps of the invention.

For a first substrate 10, a plastic material can be used as well as glass and quartz. Alternatively, an insulating film may be formed on a metal material such as stainless and aluminum in order to obtain the first substrate 10. A first conductive film 11 for forming a gate electrode and a gate wiring (gate signal line) is formed on the first substrate 10. For the first conductive film 11, a metal material such as chrome, molybdenum, titanium, tantalum, tungsten, and aluminum, or an alloy of these materials is used. The first conductive film 11 can be formed by sputtering or vacuum vapor deposition (FIG. 7A).

Figure 7B:
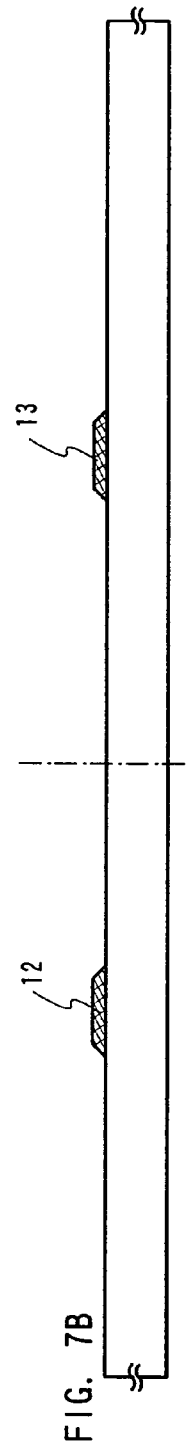

The first conductive film 11 is etched to form gate electrodes 12 and 13. The gate electrodes 12 and 13 preferably have tapered ends so that a first semiconductor film and a wiring layer are formed thereon. In the case where the first conductive film 11 comprises an aluminum-based material, a surface thereof is preferably insulated by anodization and the like after the etching step. Although not shown, a wiring connected to the gate electrodes can be formed at the same time as this step (FIG. 7B).

Figure 7C:
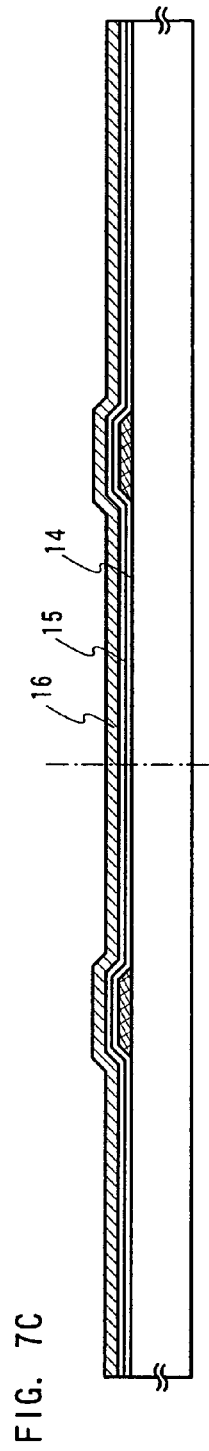

Subsequently, as shown in FIG. 7C, a first insulating film 14 and a second insulating film 15 are formed over the gate electrodes 12 and 13 in order to function as gate insulating films. In this case, it is preferable that the first insulating film 14 comprises a silicon oxide film whereas the second insulating film 15 comprises a silicon nitride film. These insulating films can be formed by glow discharge decomposition or sputtering. In particular, in order to form an insulating film having a high density and a small gate leakage current at a low deposition temperature, a reactive gas mixed with a rare gas element such as argon may be added into the insulating films.

A first semiconductor film 16 is formed over the first insulating film 14 and the second insulating film 15. The first semiconductor film 16 comprises a film which includes a semiconductor having an intermediate structure between amorphous and crystalline (including single crystalline and polycrystalline) structures. This semiconductor has a third state which is stable in free energy, and it is a kind of a crystalline semiconductor which has a short range order and a lattice distortion. The semiconductor has a grain size of 0.5 to 40 nm and can be dispersed in a non-single crystalline semiconductor. That is, Raman spectrum is shifted to the lower frequency band than 520 cm$^{-1}$. The semiconductor has a grain size of 0.5 to 40 nm on an average and can be dispersed in a non-single crystalline semiconductor. Further, the semiconductor is mixed with at least 1 atom % of hydrogen or halogen as the neutralizing agent for dangling bond. Such a semiconductor is called a semi-amorphous semiconductor (SAS). When a rare gas element such as helium, argon, krypton, or neon is mixed into an SAS, the lattice distortion is increased and the stability is thus enhanced, leading to a good SAS.

The SAS can be obtained by glow discharge decomposition of silicon gas. Typically, $SiH_4$ is used as a silicon gas, though $Si_2H_6$, $SiH_2Cl_2$, $SiHCl_3$, $SiCl_4$, $SiF_4$ or the like may be used as well. The formation of the SAS can be facilitated by using the silicon gas which is diluted by adding a single or a plurality of rare gas elements selected from among hydrogen, hydrogen and helium, argon, krypton, and neon. The silicon gas is preferably diluted with a dilution rate of 10 to 1000. It is needless to say that the reactive production of the film by glow discharge decomposition is performed under reduced pressure, but the pressure may be in the range of about 0.1 to 133 Pa. The power supply frequency for generating the glow discharge is in the range of 1 to 120 MHz, and more preferably, in the range of 13 to 60 MHz. An RF power may be set appropriately. The substrate is preferably heated at a temperature of 300° C. or less, and more preferably, 100 to 200° C. Among impurity elements which are mainly added during deposition, atmospheric elements such as oxygen, nitrogen and carbon desirably have a concentration of $1\times10^{20}$ cm$^{-3}$ or less. In particular, the concentration of oxygen is $5\times10^{19}$ cm$^{-3}$ or less, and more preferably $1\times10^{19}$ cm$^{-3}$ or less. The SAS is also called a microcrystalline semiconductor.

The silicon gas may also be mixed with a carbon gas such as $CH_4$ and $C_2H_6$, or a germanium gas such as $GeH_4$ and $GeF_4$ to set the energy bandwidth in the range of 1.5 to 2.4 eV, or 0.9 to 1.1 eV.

When an impurity element for controlling valence electrons is not added to an SAS intentionally, the SAS exhibits a small N-type conductivity. This is caused by an impurity included in the SAS, and typically, oxygen is considered to be an element which imparts an N-type conductivity. The concentration of oxygen in an SAS varies depending on an RF power density in deposition. It is preferable in the invention that the first semiconductor film 16 includes oxygen with a concentration of $5\times10^{19}$ cm$^{-3}$ or less, and more preferably $1\times10^{19}$ cm$^{-3}$ or less. Needless to say, not all oxygen functions as a donor, therefore, the amount of impurity elements is arbitrarily determined in order to control a conductivity.

Figure 7D:
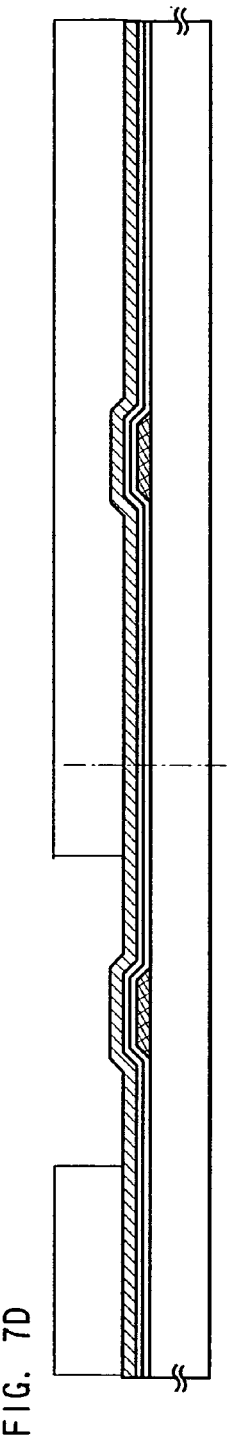

When an impurity element which imparts a P-type conductivity is added to the first semiconductor film 16 including a channel forming region at the same time as or after the deposition, a threshold voltage can be controlled. Typically, boron is used for an impurity element which imparts a P-type conductivity. An impurity gas such as $B_2H_6$ and $BF_3$ may be mixed into the silicon gas at a rate of 1 to 1000 ppm, so that boron has a concentration of $1\times10^{14}$ to $6\times10^{16}$ cm$^{-3}$. Then, a P-type impurity is doped by using a resist as a mask for covering an area in which P-channel TFTs are not to be formed (FIG. 7D).

Figure 8A:
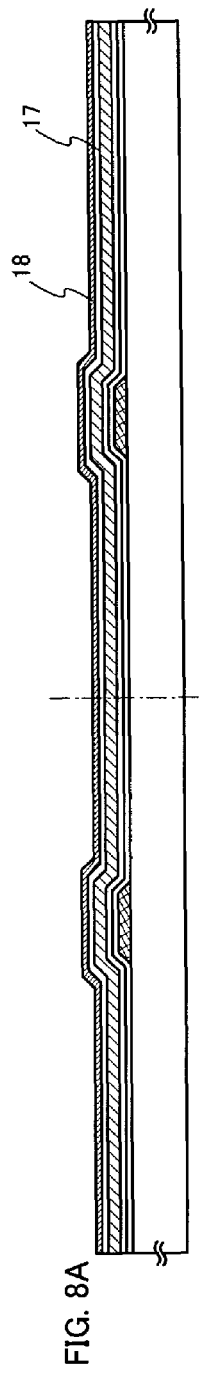
FIGS. 8A to 8D are cross sectional views showing manufacturing steps of the invention.

Subsequently, a second semiconductor film 17 is formed as shown in FIG. 8A. The second semiconductor film 17 is formed without intentionally adding an impurity element for controlling valence electrons, and is preferably formed of an SAS as the first semiconductor film 16. The second semiconductor film 17 is disposed between the first semiconductor film 16 and a third semiconductor film 18 having one conductivity and forming a source and a drain, and thereby it functions as a buffer film. Therefore, the second semiconductor film 17 is not necessarily provided when the third semiconductor film 18 has the same conductivity as the first semiconductor film 16 having a small N-type conductivity. In the case where an impurity element which imparts a P-type conductivity is added to the third semiconductor film 18 with the intention of controlling a threshold voltage, the second semiconductor film 17 functions to gradually change the concentration of impurities, leading to a good joint formation. That is, the second semiconductor film 17 is capable of serving as a lightly doped impurity region (LDD region) formed between a channel forming region and a source or a drain region in a TFT to be obtained.

The third semiconductor film 18 having one conductivity may be added with phosphorous as a typical impurity element when forming an N-channel TFT. Specifically, an impurity gas such as $PH_3$ may be mixed into the silicon gas. The third semiconductor film 18 having one conductivity can be formed of an SAS, an amorphous semiconductor, or a microcrystalline semiconductor as long as valence electrons can be controlled.

Figure 8B:
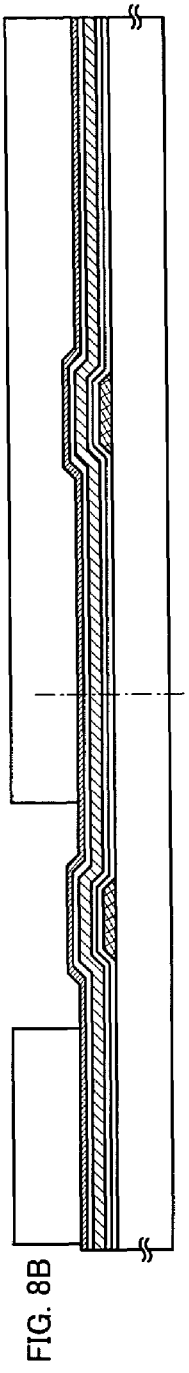

A TFT formed in such a manner has a structure in which a channel forming region is not formed between a source, a drain and an LDD region, and field crowding can be prevented as well as current crowding. Then, a P-type impurity is doped by using a resist as a mask for covering an area in which P-type TFTs are not to be formed (FIG. 8B).

Figure 8C:
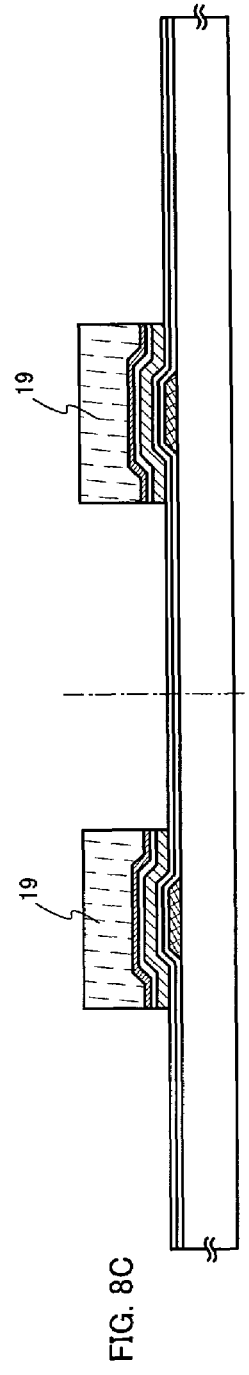

Next, a mask 19 is formed by using a photo resist. Then, the first semiconductor film 16, the second semiconductor film 17, and the third semiconductor film 18 are etched to be patterned like islands (FIG. 8C).

Figure 8D:
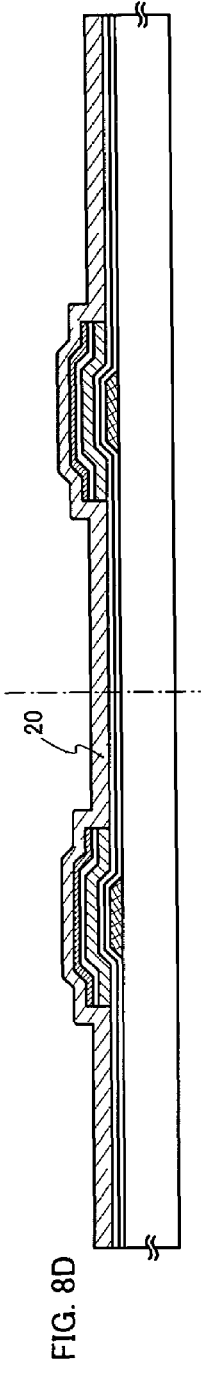

A second conductive film 20 is formed thereafter to form a wiring connected to the source and the drain. The second conductive film 20 comprises aluminum or an aluminum-based conductive material. Alternatively, the second conductive film 20 may have a laminated structure in which a film having contact with the semiconductor film comprises titanium, tantalum, molybdenum, or nitrides of these elements. Aluminum may be added with 0.5 to 5 atom % of an element such as titanium, silicon, scandium, neodymium, and copper in order to improve the heat resistance (FIG. 8D).

Subsequently, a mask 21 is formed. The mask 21 is patterned to form wirings connected to the source and the drain, and is also used as an etching mask for forming a channel forming region by removing the third semiconductor film 18 having one conductivity. The conductive film comprising aluminum or an aluminum-based material may be etched by the use of chloride gas such as $BCl_3$ and $Cl_2$. This etching process provides wirings 23 to 26. The channel forming region is formed by etching by the use of fluoride gas such as $SF_6$, $NF_3$, and $CF_4$. In this case, it is not possible to have etch selectivity relative to first semiconductor films 16a and 16b which are to be used as base layers, therefore, processing time has to be adjusted appropriately. In this manner, a channel etched TFT can be obtained (FIG. 9A).

Next, a third insulating film 27 for protecting the channel forming region comprises a silicon nitride film. The silicon nitride film can be formed by sputtering or glow discharge decomposition, and is required to have a high density in order to block out pollutants in the atmosphere such as organic materials, metals, and moisture. When the silicon nitride film is formed by RF sputtering using silicon as a target, the use of a sputtering gas in which a rare gas element such as argon is mixed with nitride promotes the high density of the silicon nitride film. On the other hand, when the silicon nitride film is formed by glow discharge decomposition, the silicon nitride film is obtained by diluting a silicon gas by 100 to 500 times with a rare gas element such as argon. Thus, the silicon nitride film is capable of having a high density at a low temperature of 100° C. or less. Further, a fourth insulating film 28 comprising a silicon oxide film may be laminated on the third insulating film 27 as needed. The third insulating film 27 and the fourth insulating film 28 correspond to passivation films (FIG. 9B).

A planarizing film 29 is formed on the third insulating film 27 and/or the fourth insulating film 28. The planarizing film 29 is preferably formed of an organic resin such as acrylic, polyimide, and polyamide, or a siloxane-based insulating film having a Si—O bond and a Si—CHx bond. Then, contact holes are formed in the third insulating film 27, the fourth insulating film 28, and the planarizing film 29, so as to form on the planarizing film 29 wirings 30 to 33 connected to the wirings 23 to 26, respectively (FIG. 9C).

The wirings 30 to 33 can be formed of an element selected from among Ta, W, Ti, Mo, Al, and Cu, or an alloy or a compound including the element as a main component. Alternatively, a plurality of conductive films having these elements can be laminated to obtain the wirings 30 to 33. For example, it is possible that the first film comprises Ta and the second layer comprises W, the first layer comprises TaN and the second layer comprises Al, the first layer comprises TaN and the second layer comprises Cu, or the first layer comprises Ti, the second layer comprises Al, and the third layer comprises Ti. Either the first layer or the second layer may be formed of an AgPdCu alloy. W, an alloy of Al and Si (Al—Si), and TiN may be sequentially laminated as well. Tungsten nitride may be used instead of W, an alloy of Al and Ti (Al—Ti) may by substituted for the alloy of Al and Si (Al—Si), or Ti may be used instead of TiN.

The channel etched TFT formed in this manner, whose channel portion comprises an SAS, has a field effect mobility of 2 to 10 cm²/Vs. Accordingly, this TFT can be applied to a switching element of a pixel and an element for forming a scan line (gate line) driver circuit.

An element substrate in which both a switching element of a pixel and a gate signal line driver circuit are made up of the same type of TFTs can be formed by using six masks: a gate electrode forming mask, a semiconductor region forming mask, a P-type impurity doping mask, a wiring forming mask, a contact hole forming mask, and a pixel electrode forming mask.

Embodiment 3

Figure 11A:
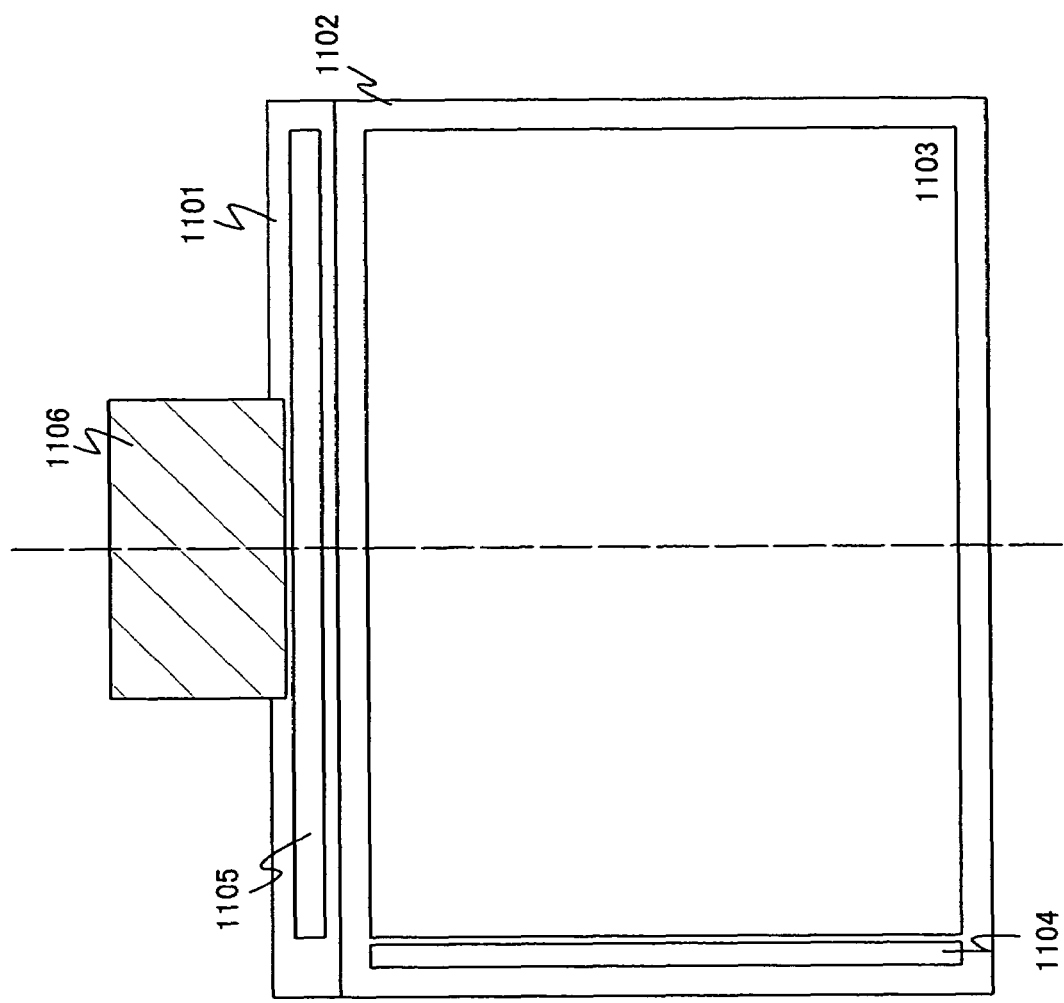
FIGS. 11A and 11B are diagrams each showing a liquid crystal display device using the invention.
Figure 11B:
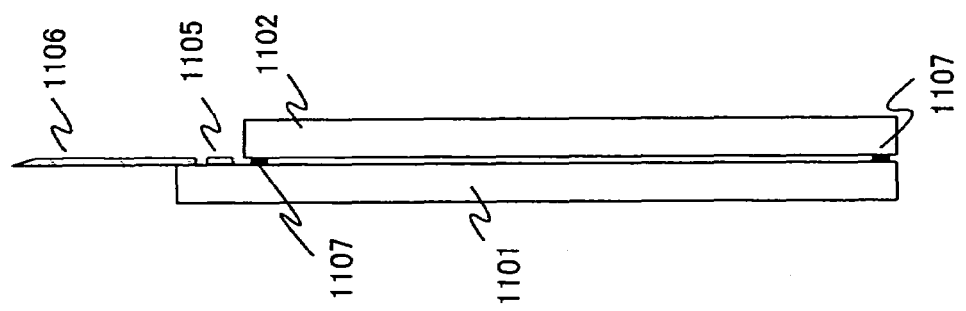

FIG. 11A is a plan view of a liquid crystal display device using the invention. The liquid crystal display device shown in FIG. 11A comprises a semi-amorphous TFT substrate 1101, a counter substrate 1102, a pixel portion 1103, a gate signal line driver circuit 1104, a source signal line driver circuit 1105, and an FPC 1106. FIG. 11B is a cross sectional view taken by cutting along a dotted line of the liquid crystal display device in FIG. 11B. A liquid crystal material is disposed between the TFT substrate 1101 and the counter substrate 1102, and sealed with a sealing member 1107.

As set forth above, according to the invention, the gate signal line driver circuit 1104 is integrally formed on the substrate by using semi-amorphous TFTs, leading to reduction in the cost of implementation and improvement of the reliability in connecting parts. In FIG. 11A, the source signal line driver circuit 1105 is mounted on the TFT substrate 1101. In this embodiment, the source signal line driver circuit 1105 is formed on another glass substrate, and thereby a driver circuit chip having the same length as the lateral direction of the pixel portion is formed to be mounted on the TFT substrate 1101. The driver circuit chip formed on a glass substrate contributes to reduction in costs as compared with a single crystalline chip. The source signal line driver circuit 1105 is not necessarily mounted by using a chip formed on a glass substrate, and a single crystalline chip may be mounted on the TFT substrate 1101 or on the FPC 1106.

Embodiment 4

Figure 12:
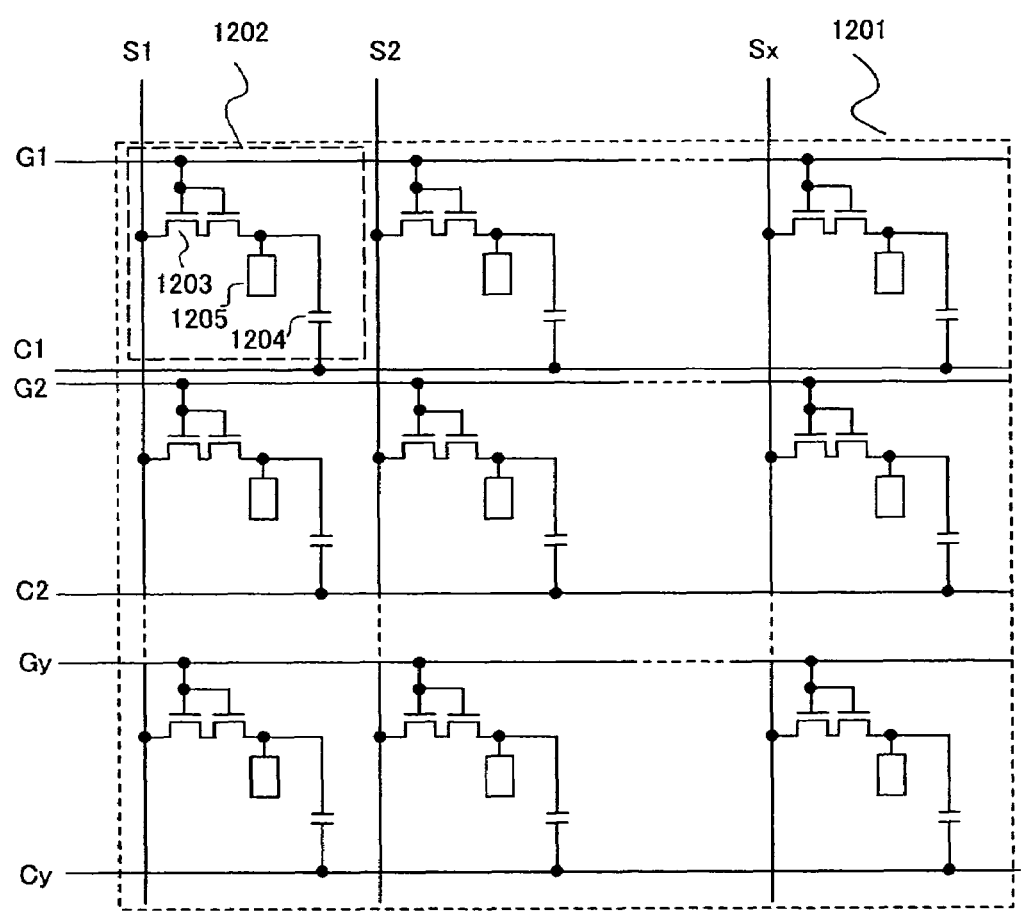
FIG. 12 is a diagram showing a pixel of a liquid crystal display device using the invention.

FIG. 12 is an equivalent circuit diagram of a pixel portion of a liquid crystal display device using the invention. A pixel portion 1201 comprises source signal lines S1, S2, . . . , and Sx, gate signal lines G1, G2, . . . , and Gy, capacitor lines C1, C2, . . . , and Cy, and a plurality of pixels. A pixel 1202 comprises a pixel TFT 1203, a pixel electrode 1205, and a storage capacitor 1204. In the case of using a semi-amorphous TFT for the pixel TFT 1203, the pixel TFT 1203 has a double gate structure in order to reduce the OFF-current as shown in FIG. 12, since a semi-amorphous TFT has a larger OFF-current as compared with an amorphous TFT. Although a double gate structure is shown in FIG. 12, the pixel TFT 1203 may have a triple gate or multi gate structure.

Embodiment 5

Figure 13:
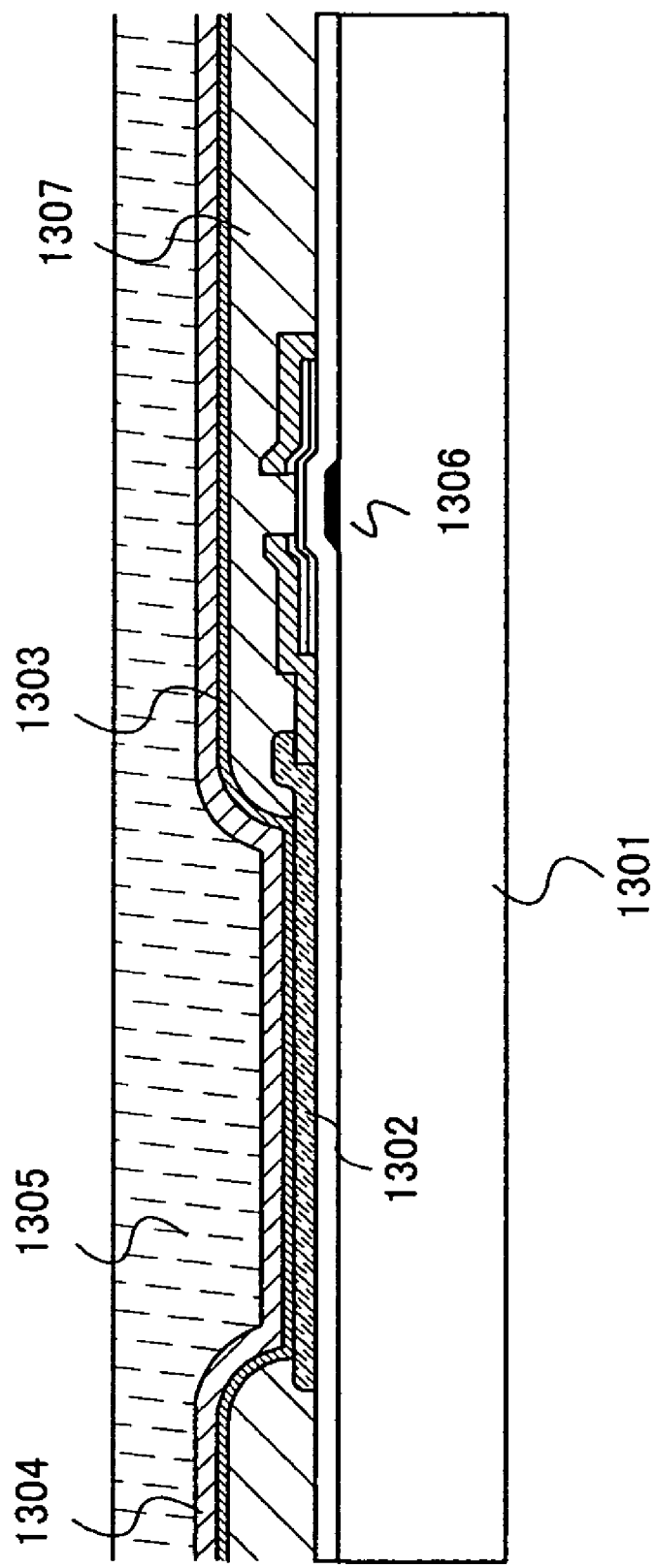
FIG. 13 is a diagram showing a self-light emitting display device using the invention.

FIG. 13 is cross sectional view of a pixel portion of a self-light emitting display device using the invention. An EL element is used as a light emitting element in FIG. 13. A pixel TFT 1306 using a semi-amorphous TFT is formed on a TFT substrate 1301, and an electrode 1302 is formed thereover so as to be connected to a drain electrode of the pixel TFT 1306. Then, an insulating film 1307 is deposited and patterned to form an opening in the electrode 1302. Subsequently, an organic material 1303 serving as a light emitting portion is deposited and an electrode 1304 is formed thereon. Known materials may be used for the organic material and the electrodes. Depending on the combination of materials, top emission, bottom emission, or dual emission can be achieved. An area 1305 over the electrode 1304 is shielded from the outside and sealed. The sealing keeps out the external moisture and the like, and thus degradation of an EL material can be prevented.

Embodiment 6

Figure 10:
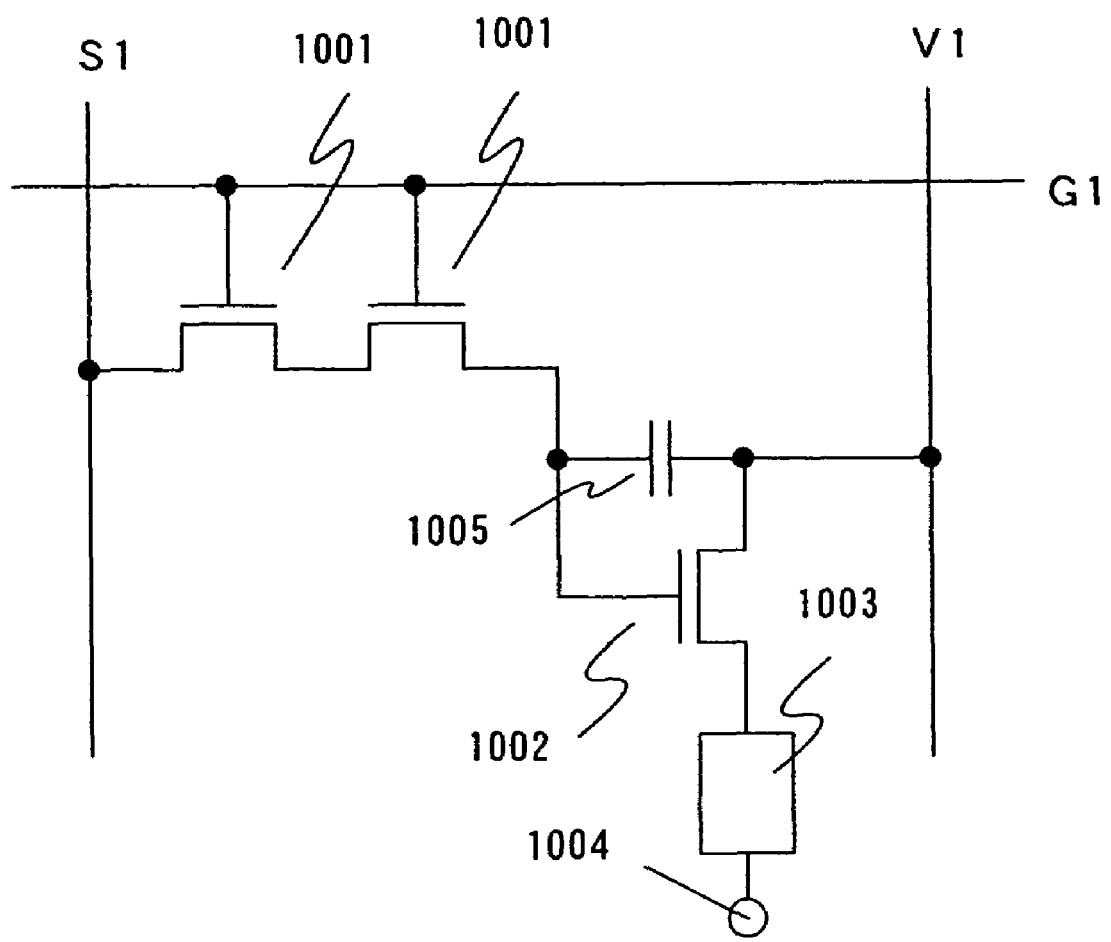
FIG. 10 is a diagram showing a pixel of a self-light emitting display device using the invention.

FIG. 10 shows a pixel configuration of a self-light emitting display device using the invention. A pixel shown in FIG. 10 comprises a source signal line S1, a gate signal line G1, a power supply line V1, switching TFTs 1001, a driving TFT 1002, a light emitting element 1003, an electrode 1004, and a storage capacitor 1005. Since an N-channel TFT is generally used for a pixel TFT using a semi-amorphous TFT, the switching TFTs 1001 and the driving TFT 1002 have an N-type conductivity in FIG. 14, however, the invention is not limited to the N-channel TFT.

A semi-amorphous TFT has a larger OFF-current as compared with an amorphous TFT. Therefore, in the case where a semi-amorphous TFT is used for a pixel TFT, the pixel TFT has a double gate structure as shown in FIG. 10 to reduce the OFF-current. Although the double gate structure is shown as an example in FIG. 10, a triple gate or multi gate structure may also be adopted.

The pixel configuration with two TFTs is shown in FIG. 10, though the invention is not limited to this, and other known pixel configurations may be adopted as well.

Embodiment 7

The display device formed in such a manner can be applied to a display portion of various electronic apparatuses. Explanation is hereinafter made on an electronic apparatus which includes the display device of the invention as a display medium.

The display device of the invention can be applied to a television, a video camera, a digital camera, a head mounted display (goggle type display), a game player, a car navigation system, a personal computer, cellular phone, and the like. Specific examples of them are shown in FIGS. 6A to 6C.

Figure 6A:
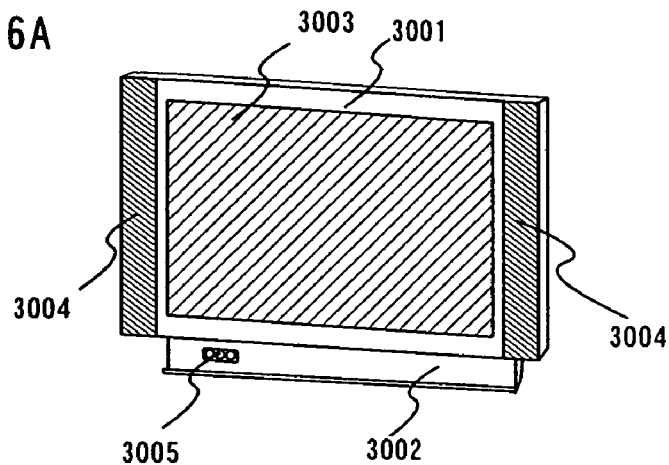
FIGS. 6A to 6C are views showing electronic apparatuses using the display device of the invention.

FIG. 6A shows a television which includes a housing 3001, a supporting base 3002, a display portion 3003, a speaker portion 3004, a video input terminal 3005 and the like. The display device of the invention can be applied to the display portion 3003 to complete a television.

Figure 6B:
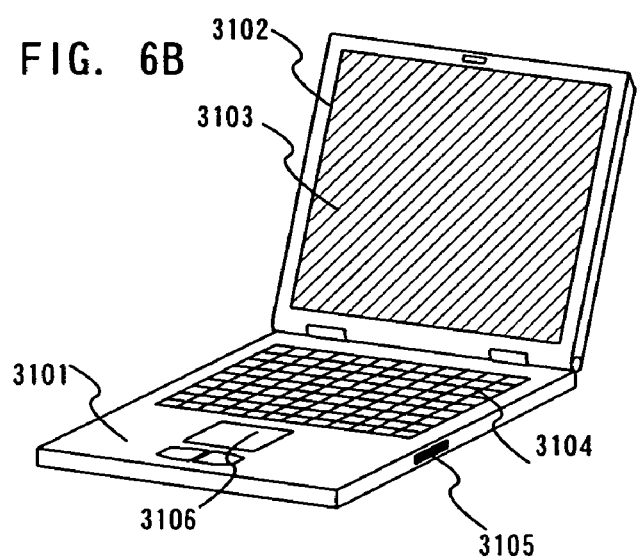

FIG. 6B shows a notebook personal computer which includes a main body 3101, a housing 3102, a display portion 3103, a keyboard 3104, an external connecting port 3105, a pointing mouse 3106 and the like. The display device of the invention can be applied to the display portion 3103 to achieve a small and lightweight notebook personal computer.

Figure 6C:
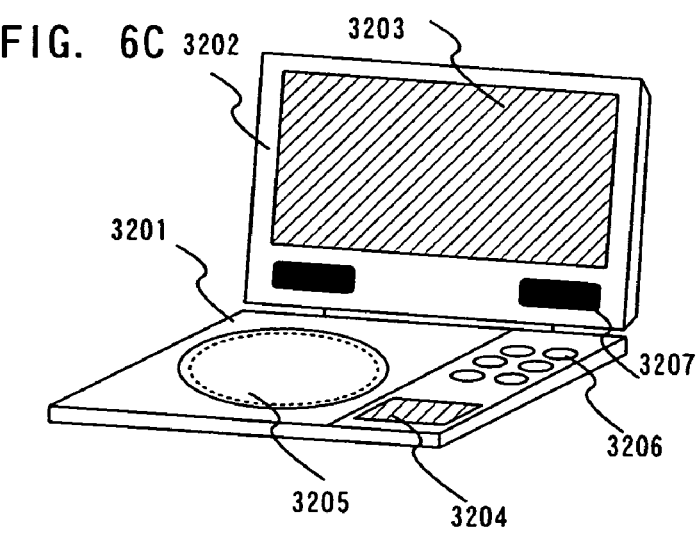

FIG. 6C shows an image reproducing device provided with a recording medium (specifically, a DVD reproducing device), which includes a main body 3201, a housing 3202, a recording medium (CD, LD, DVD, or the like) reading portion 3205, an operating switch 3206, a speaker portion 3207, a display portion A 3203, a display portion B 3204 and the like. The display portion A 3203 mainly displays image information whereas the display portion B 3204 mainly displays character information. The display device of the invention can be applied mainly to the display portion A 3203 to achieve a small and lightweight image reproducing device. It is to be noted that the display device of the invention can be applied to other image reproducing devices provided with a recording medium, such as a CD reproducing device and a game player.

As set forth above, the application range of the invention is so wide that the invention can be applied to electronic apparatuses of all fields. The electronic apparatuses shown in this embodiment can be obtained by using any configuration shown in Embodiment Mode 1 and Embodiments 1 to 6.

This application is based on Japanese Patent Application serial no. 2003-277191 filed in Japan Patent Office on 18th, Jul. 2003, the contents of which are hereby incorporated by reference.

Although the present invention has been fully described by way of Embodiment Modes and Embodiments with reference to the accompanying drawings, it is to be understood that various changes and modifications will be apparent to those skilled in the art. Therefore, unless such changes and modifications depart from the scope of the present invention hereinafter defined, they should be constructed as being included therein.

What is claimed is:

1. A display device comprising:
   a plurality of gate signal lines over a substrate;
   a pixel portion having a plurality of pixels over the substrate; and
   a gate signal line driver circuit connected to the plurality of gate signal lines over the substrate,
   wherein the gate signal line driver circuit comprises latch circuits configured to store data for determining if each gate signal line is driven, a buffer circuit configured to drive the plurality of gate signal lines, and a circuit configured to control an input to the buffer circuit according to an output of the latch circuit.

2. A device according to claim 1, wherein the pixel portion and the gate signal line driver circuit are integrally formed on the substrate and comprise a semi-amorphous TFT, respectively.

3. A device according to claim 2, wherein the semi-amorphous TFT is a complementary TFT.

4. A device according to claim 1, wherein the display device is a liquid crystal display device.

5. A device according to claim 1, wherein the display device is a self-light emitting display device.

6. A device according to claim 5, wherein the display device is a display device using an EL material.

7. A television comprising the display device according to claim 1.

8. A personal computer comprising the display device according to claim 1.

9. A camera comprising the display device according to claim 1.

10. A cellular phone comprising the display device according to claim 1.

11. A display device comprising:
a plurality of gate signal lines over a substrate;
a pixel portion having a plurality of pixels over the substrate; and
a gate signal line driver circuit comprising a shift register, a first switch circuit, a second switch circuit, a latch circuit, and a buffer circuit,
wherein the first switch circuit is inputted with a first switching signal and an output of the shift register, and the first switch circuit outputs a signal to the latch circuit or the second switch circuit,
wherein the second switch circuit is inputted with an output of the latch circuit and with the signal outputted from one of the first switch circuit and a ground potential, and the second switch circuit outputs a signal to an inverter of the buffer circuit, and
wherein the latch circuit is controlled by a latch pulse and stores the output of the first switch circuit.

12. A device according to claim 11, wherein the pixel portion and the gate signal line driver circuit are integrally formed on the substrate and comprise a semi-amorphous TFT, respectively.

13. A device according to claim 12, wherein the semi-amorphous TFT is a complementary TFT.

14. A device according to claim 11, wherein the display device is a liquid crystal display device.

15. A device according to claim 11, wherein the display device is a self-light emitting display device.

16. A device according to claim 15, wherein the display device is a display device using an EL material.

17. A television comprising the display device according to claim 11.

18. A personal computer comprising the display device according to claim 11.

19. A camera comprising the display device according to claim 11.

20. A cellular phone comprising the display device according to claim 11.

21. A semiconductor device comprising:
a plurality of gate signal lines over a substrate;
a pixel portion having a plurality of pixels over the substrate; and
a gate signal line driver circuit connected to the plurality of gate signal lines over the substrate, the gate signal line driver circuit comprising latch circuits configured to store data for determining if each gate signal line is driven, a buffer circuit configured to drive the plurality of gate signal lines, and a circuit configured to control an input to the buffer circuit according to an output of the latch circuit,
wherein the pixel portion and the gate signal line driver circuit comprise a plurality of thin film transistors formed on the substrate, and each of the thin film transistors comprises a semi-amorphous semiconductor.

22. A device according to claim 21, wherein the semi-amorphous semiconductor has grains each of which size is 0.5 to 40 nm and dispersed in a non-single crystalline semiconductor.

23. A device according to claim 21, wherein the semi-amorphous semiconductor includes at least one of hydrogen and halogen elements.

24. A device according to claim 21, wherein the semi-amorphous semiconductor includes at least one of helium, argon, krypton, and neon.

25. A device according to claim 21, wherein the display device is a liquid crystal display device.

26. A device according to claim 21, wherein the display device is a light emitting display device.

27. A television comprising the display device according to claim 21.

28. A personal computer comprising the display device according to claim 21.

29. A camera comprising the display device according to claim 21.

30. A cellular phone comprising the display device according to claim 21.

31. A semiconductor device comprising:
a plurality of gate signal lines over a substrate;
a pixel portion having a plurality of pixels over the substrate; and
a gate signal line driver circuit comprising a shift register, a first switch circuit, a second switch circuit, a latch circuit, and a buffer circuit,
wherein the first switch circuit is inputted with a first switching signal and an output of the shift register, and the first switch circuit outputs a signal to the latch circuit or the second switch circuit,
wherein the second switch circuit is inputted with an output of the latch circuit and with the signal outputted from one of the first switch circuit and a ground potential, and the second switch circuit outputs a signal to an inverter of the buffer circuit,
wherein the latch circuit is controlled by a latch pulse and stores the output of the first switch circuit, and
wherein the pixel portion and the gate signal line driver circuit comprise a plurality of thin film transistors formed on the substrate, and each of the thin film transistors comprises:
a gate electrode on the substrate;
a gate insulating film over the gate electrode;
a semiconductor film over the gate insulating film, the semiconductor film comprising a semi-amorphous semiconductor.

32. A device according to claim 31, wherein the semi-amorphous semiconductor has grains each of which size is 0.5 to 40 nm and dispersed in a non-single crystalline semiconductor.

33. A device according to claim 31, wherein the semi-amorphous semiconductor includes at least one of hydrogen and halogen elements.

34. A device according to claim 31, wherein the semi-amorphous semiconductor includes at least one of helium, argon, krypton, and neon.

35. A device according to claim 31, wherein the display device is a liquid crystal display device.

36. A device according to claim 31, wherein the display device is a light emitting display device.

37. A television comprising the display device according to claim 31.

38. A personal computer comprising the display device according to claim 31.

39. A camera comprising the display device according to claim 31.

40. A cellular phone comprising the display device according to claim 31.

* * * * *